United States Patent [19]

Yamaguchi

[11] 4,304,391
[45] Dec. 8, 1981

[54] ELECTROMAGNETICALLY OPERATED VALVE ASSEMBLY

[75] Inventor: Hirotsugu Yamaguchi, Fujisawa, Japan

[73] Assignee: Nissan Motor Company, Ltd., Japan

[21] Appl. No.: 8,560

[22] Filed: Feb. 1, 1979

Related U.S. Application Data

[63] Continuation of Ser. No. 752,966, Dec. 21, 1976, abandoned.

[30] Foreign Application Priority Data

Dec. 24, 1975 [JP] Japan .................................. 50/153382

[51] Int. Cl.³ ............................................ F16K 31/06
[52] U.S. Cl. .................................... 251/129; 251/141; 335/258
[58] Field of Search ................. 251/129, 141; 335/258

[56] References Cited

U.S. PATENT DOCUMENTS

| 2,631,612 | 3/1953 | Buescher | 251/141 X |
| 2,853,659 | 9/1958 | Herion | 335/258 |
| 2,860,850 | 11/1958 | Rhodes et al. | 251/141 X |
| 3,653,630 | 4/1972 | Ritsema | 251/129 |
| 3,742,407 | 6/1973 | Cardew et al. | 335/258 |
| 3,873,060 | 3/1975 | Espenschied | 251/129 |
| 4,010,769 | 3/1977 | De Lorenzo | 251/141 X |

Primary Examiner—Arnold Rosenthal
Attorney, Agent, or Firm—Robert E. Burns; Emmanuel J. Lobato; Bruce L. Adams

[57] ABSTRACT

A magnetic shield having a great hardness is interposed between a core of a coil and a movable non-magnetic piece.

1 Claim, 3 Drawing Figures

ELECTROMAGNETICALLY OPERATED VALVE ASSEMBLY

This is a continuation of application Ser. No. 752,966, filed Dec. 21, 1976, now abandoned.

BACKGROUND OF THE INVENTION

1. Field of the Invention

The present invention relates generally to an electromagnetically operated valve assembly for controlling the flow of fluid by modulating the pulse width and particularly to a valve assembly of this type which is improved to increase its durability and its responsibility to intermittance of operating electric current by reducing the preload of a spring and by interposing between an iron core and a movable member a shield nonmagnetic material having a great hardness.

2. Description of the Prior Art

As is well known in the art, since an electromagnetically operated valve assembly of this type is driven at a frequency of several tens Hz for making pulsation of fluid small and is opened and closed extremely many times, it is required to have a severe durability and a satisfactory responsibility. However, conventional electromagnetically operated valve arrangements have not met these requirements and have been usually damaged by opening and closing of about $3 \times 10^6$ to $5 \times 10^7$ times in durability.

SUMMARY OF THE INVENTION

It is, therefore, an object of the invention to provide an electromagnetically operated valve assembly which is improved to have increased durability and responsibility.

For accomplishing this object, the valve assembly comprises a shield interposed between an iron core and a movable member and made of a non-magnetic material having a great hardness. The shield serves to cut off an attractive force due to a residual magnetism of the iron core from the movable member and to render it possible to reduce the preload of a return spring. This results in a reduction in a shock with which a valve is engaged with a valve seat by the force of the spring.

BRIEF DESCRIPTION OF THE DRAWINGS

This and other objects and advantages of the invention will become more apparent from the following detailed description taken in connection with the accompanying drawings in which.

DESCRIPTION OF THE PREFERRED EMBODIMENT

Figure 1:
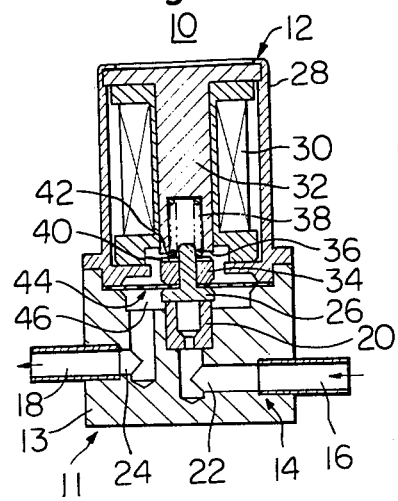
FIG. 1 is a schematic cross sectional view of a first preferred embodiment of an electromagnetically operated valve assembly according to the invention.

Referring to FIG. 1 of the drawings, there is shown an electromagnetically operated valve assembly or arrangement according to the invention. The valve assembly, generally designated by the reference numeral 10, comprises a flow control valve section 11 and an operating device section 12 for the flow control valve section 11. The flow control valve section 11 comprises a valve body 13 formed with a passage 14 which has inlet and outlet ports 16 and 18 and through which fluid is passed. A valve seat 20 is formed in the passage 14 and divides the passage 14 into upstream and downstream portions 22 and 24. A valve head 26 is disposed in the passage 14 movably relative to the valve seat 20 and is engaged with and disengaged from the valve seat 20 to close and open the passage 14.

The operating device section 12 comprises a casing 28 fixedly mounted on the valve body 13. A solenoid coil 30 is located in the casing 28 and is included in an electric control circuit (not shown) through terminals (not shown) for supplying an electric current to the coil 30 and interrupting supply of the electric current to the coil 30. An iron core or a core 32 made of a magnetic material is located in the coil 30. A movable member 34 is arranged movably relative to the iron core 32 and is movable toward and away from an end 36 of the iron core 32. The movable member 34 is fixedly and operatively connected to the valve 26 and is made of a material such as, for example, soft iron or a magnetic material which has a high magnetic permeability. A return spring 38 is provided to urge the movable member 34 away from the iron core 32 and into a position in which the valve head 26 is seated on the valve seat 20. When an electric current is fed to the coil 30 to energize it, the iron core 32 is magnetized in response to energization of the coil 30 so that the movable member 34 is attracted toward the iron core 32 by an attractive force overcoming the force of the spring 38. When the control circuit interrupts supply of the electric current to the coil 30 to deenergize it, the iron core 32 is demagnetized in response to deenergization of the coil 30 so that the movable member 34 is moved away from the iron core 32 by the force of the spring 38.

The force or preload of the spring 38 is set at a suitable value smaller than that of a spring of a conventional electromagnetically operated valve assembly. This is to reduce a shock with which the valve head 26 is engaged with the valve seat 20 by the spring 38 when the iron core 32 is demagnetized to thereby increase the durability of the valve assembly 10.

A shield or screen 40 is interposed between the iron core 32 and the movable member 34. Both surfaces of the shield 40 are flat at all times. The shield 40 is fixedly secured at one of the surfaces thereof by suitable fastening means such as adhesives or plumb joint to an end surface 42 of the movable member 34 so that the shield 40 is engaged with the disengaged from the iron core 32 when the movable member 34 is moved toward and away from the iron core 32. Alternatively, the shield 40 may be fixedly secured at the other surface thereof by suitable fastening means to the end surface 36 of the iron core 32 so that the movable member 34 is engaged with and disengaged from the shield 40 when the movable member 34 is moved toward and away from the core 32. The shield 40 is in the form of a thin plate made of a nonmagnetic material or metal such as, for example, stainless steel and has a flat configuration. The shield 40 is provided for rendering it possible to reduce the preload of the spring 38 as mentioned above. The shield 40 serves to reduce an attractive force exerted on the movable member 34 by a residual magnetism of the iron core 32 when the supply of the electric current to the coil 30 is cut off so as to shorten a time or time lag during that the movable member 34 is moved toward the iron core 32 by the force of its residual magnetism overcoming the reduced force of the spring 38.

Figure 2:
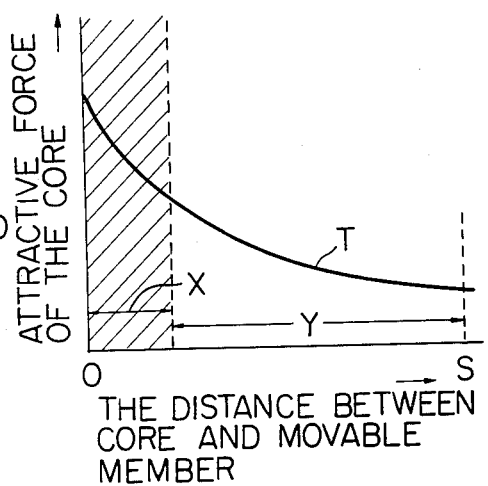
FIG. 2 is a graphic representation of the relationship between the distance between an iron core and a movable member of the valve arrangement shown in FIG. 1 and an attractive force of the iron core and FIG. 3 is a graphic representation of the relationship between an attractive force due to a residual magnetism of the iron core of FIG. 1 and time.
Figure 3:
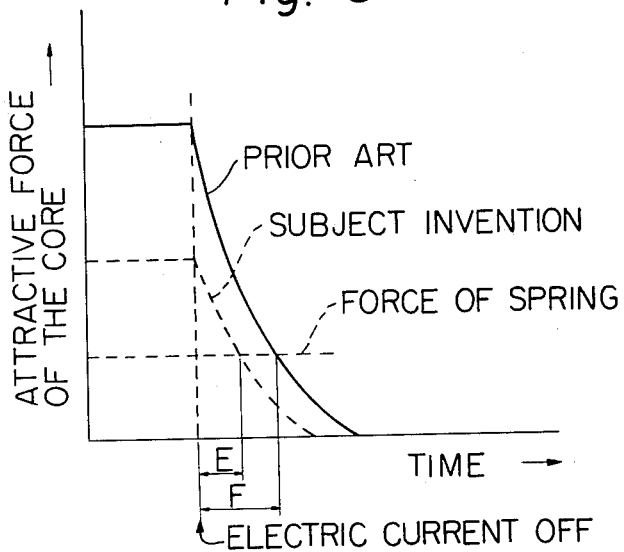

Referring to FIG. 2 of the drawings, there is shown the relationship between the attractive force of the iron core 32 and the distance between the iron core 32 and the movable member 34. In FIG. 2, S on the axis of abscissa represents the distance between the end surface 36 of the iron core 32 and the end surface 42 of the movable member 34 in a position in which the valve head 26 is seated on the valve seat 20. X and Y represent the thickness of the sheet 40 and the range or distance of movement of the movable member 34, respectively. As the distance between the iron core 32 and the movable member 34 is reduced, the attractive force of the iron core 32 is increased in inverse proportion to the square of the distance between the iron core 32 and the movable member 34, as shown by the solid curve T in FIG. 2. Accordingly, when the shield 40 is engaged with the iron core 32, the shield 40 eliminates or cuts off the attractive fore which is within a zone equal to the thickness of the shield 40 as shown by the hatching portion in FIG. 2 and is within a range in which the attractive force is abruptly increased with decreases in the distance between the iron core 32 and the movable member 34. However, when the movable member 34 is adjacent to the position in which the valve head 26 is engaged with the valve seat 20, since the attractive force acting on the end surface 42 of the movable member 34 is extremely slightly increased with decreases in the distance between the iron core 32 and the movable member 34, the attractive force for moving the movable member 34 toward the iron core 32 is not almost affected or reduced by the provision of the shield 40 when an electric current is fed to the coil 30 to magnetize the iron core 32. On the contrary, the responsibility or responsiveness of the movable member 34 to the magnetization of the iron core 32 is increased or advanced by the share of a decrease in the preload of the spring 38. Also, when the shield 40 is engaged with the iron core 32, although the attractive force acting on the movable member 34 is smaller than the attractive force acting on a movable member which is not provided with a shield as a conventional valve assembly, the attractive force acting on the movable member 34 is at a value sufficient for maintaining the movable member 34 in a condition engaged with the iron core 32 since the force of the spring 38 is reduced. On the other hand, in general, when the supply of the electric current to the coil is stopped, the attractive force of the iron core reaches zero after the lapse of several milliseconds due to a residual magnetism of the iron core, as shown in FIG. 3 of the drawings. In this instance, the attractive force acting on the end surface 42 of the movable member 34 reaches zero more early than that acting on a movable member provided with no shield, as shown in FIG. 3. Furthermore, in general, until the attractive force due to the residual magnetism of the iron core is reduced to a value equal to the force of the spring after deenergization of the coil, the movable member 34 is kept in a condition engaged with the iron core 32 through the shield 40 by the attractive force. Accordingly, the shield 40 is disengaged from the iron core 32 by the force of the spring with a time lag or response delay after cutoff of the supply of the electric current to the coil. In this instance, when it is assumed that the force of the spring 38 is equal to that of a spring of a conventional valve assembly, the response delay E of the movable member 34 is shorter than the response delay F of a movable member of a conventional valve assembly, as shown in FIG. 3. Accordingly, even if the force of the spring 38 is set at a necessary value weaker than the force of a spring of a conventional valve assembly, the responsibility of the movable member 34 to the deenergization of the coil is equal to or above that of a movable member of the conventional valve assembly.

Returning to FIG. 1, a flexible diaphgram 44 is fixedly connected to the movable member 34 and/or the valve 26 and defines a pressure chamber 46 in the passage 14 downstream of the valve seat 20. When an electric current is fed to the coil 30 and the movable member 34 is engaged with the iron core 32 through the shield 40 by an attractive force of the iron core 32, the valve head 26 is disengaged from the valve seat 20 to provide communication between the upstream and downstream portions 22 and 24 of the passage 14. Concurrently, the diaphragm 44 is moved away from the valve seat 22 by the movable member 34 to increase the volume of the pressure chamber 46. As a result, the pressure of fluid in the pressure chamber 46 is reduced to suck in fluid from the upstream passage 22 into the pressure chamber 46. At this state, when the supply of the electric current to the coil 30 is cut off, the movable member 34 is moved toward the valve seat 20 to disengage the shield 40 from the iron core 32 in response to deenergization of the coil 30. As a result, the valve head 26 is seated on the valve seat 20 by the movable member 34 to block communication between the upstream and downstream passages 22 and 24. Concurrently, the diaphragm 44 is moved toward the valve seat 20 by the movable member 34 to reduce the volume of the pressure chamber 46. As a result, the fluid in the pressure chamber 46 is forced out to the passage 14 downstream of the pressure chamber 46. Thus, the above-mentioned operations are repeated by intermittently supplying an electric current to the coil 30. By varying the width of a pulse electric current fed to the coil 30, it is possible to control in accordance with the pulse width the flow of fluid passed through the passage 14. The valve arrangement 10 can be employed for controlling the flow of gas and liquid.

The shield 40 is made of a material or metal having a great hardness. This is because it is necessary for the shield 40 to have a long or high durability. The greater the shield 40 is, the superiorer the durability of the shield 40 is. It is desirable that the hardness of the shield 40 has a hardness greater than Vickers Hardness 200. The sheet 40 may have a thickness of 0.1 to 0.02 mm. It has been confirmed by an experiment made as to the valve arrangement 10 employing as the shield 40 a sheet made of stainless steel and having the thickness of 0.2 mm that the valve arrangement 10 can satisfactorily endure open and closed operations exceeding $3 \times 10^8$ times and has a satisfactory responsibility to a frequency to the extent of about 100 Hz or that the valve arrangement 10 can be driven at a frequency as high as 100 Hz.

A conventional electromagnetically operated valve arrangement has included a sheet interposed between an iron core and a movable magnetic piece which is made of copper and has the thickness of about 0.1 mm. This sheet has been provided for merely preventing galvanization plated on the iron core from being peeled away. Also, the durability of the sheet has been extremely low or equal to zero. Accordingly, it is apparent that the sheet is entirely different in effect or function from and is far inferior in durability to the shield 40 of the valve arrangement 10.

It will be thus appreciated that the invention provides an improved electromagnetically operating device for a flow control valve, comprising a nonmagnetic shield having a great hardness which is interposed between a core of a coil and a movable magnetic piece for separating from the magnetic piece an attractive force of the core which is within a zone most adjacent to the core and most strongly attracts the magnetic piece so that the flow control valve has a satisfactory responsibility to a high frequency to the extent of about 100 Hz and an increased durability.

What is claimed is:

1. An electromagnetically operated valve assembly comprising a flow control valve section and an operating device section for said flow control valve section, said flow control valve section comprising passage-defining means defining a passage through which fluid is passed, a valve seat located in said passage and dividing said passage into upstream and downstream portions, and a valve disposed in said passage movable relative to said valve seat for engagement with and disengagement from said valve seat, said operating device section comprising a coil having a core, said coil being alternatively energized and de-energized for causing magnetization and demagnetization of said core, respectively, a movable member movable toward and away from said core in response to energization and deenergization of said coil, respectively, a shield, both surfaces of said shield being flat at all times, said shield being fixedly secured at one of said surfaces thereof to an end surface of said movable member, said shield being made of a nonmagnetic metal having a great hardness greater than Vickers Hardness 200, said shield being engageable with and disengagement from said core when said movable member is moved toward and away from said core, respectively, biasing means for urging said movable member away from said core, said movable member being so operatively connected to said valve that said valve is engaged with said valve seat for blocking communication between said upstream and downstream portions when moved toward said core, a flexible diaphragm defining a pressure chamber in said passage downstream of said valve seat, said movable member being so operatively connected to said diaphragm that said diaphragm is moved into a position to increase the volume of said pressure chamber sucking in fluid thereinto from said upstream portion when said movable member is moved toward said core and into a position to reduce the volume of said pressure chamber for forcing out fluid from said pressure chamber to said passage downstream of said pressure chamber when said movable member is moved away from said core.

* * * * *